(12) United States Patent
Fleming et al.

(10) Patent No.: US 11,296,469 B2
(45) Date of Patent: Apr. 5, 2022

(54) QUICK RELEASE JUNCTION BOX ASSEMBLY

(71) Applicants: Kent Fleming, Bristol, TN (US); Scott Fleming, Bristol, TN (US)

(72) Inventors: Kent Fleming, Bristol, TN (US); Scott Fleming, Bristol, TN (US)

( * ) Notice: Subject to any disclaimer, the term of this patent is extended or adjusted under 35 U.S.C. 154(b) by 114 days.

(21) Appl. No.: 16/861,925

(22) Filed: Apr. 29, 2020

(65) Prior Publication Data

US 2021/0344151 A1 Nov. 4, 2021

(51) Int. Cl.
| | | |
|---|---|---|
| *H01R 33/06* | (2006.01) | |
| *H01R 13/74* | (2006.01) | |
| *H02G 3/16* | (2006.01) | |
| *F21V 23/00* | (2015.01) | |
| *F21V 23/06* | (2006.01) | |
| *H02G 3/08* | (2006.01) | |

(52) U.S. Cl.
CPC ........... *H01R 33/06* (2013.01); *F21V 23/001* (2013.01); *F21V 23/06* (2013.01); *H01R 13/74* (2013.01); *H02G 3/083* (2013.01); *H02G 3/16* (2013.01)

(58) Field of Classification Search
CPC ...... F21V 21/047; F21V 23/06; F21V 23/001; H01R 33/06; H01R 13/74; H02G 3/083; H02G 3/16
See application file for complete search history.

(56) References Cited

U.S. PATENT DOCUMENTS

| | | | |
|---|---|---|---|
| 2,031,914 A | | 2/1936 | Veysey |
| 3,432,629 A | * | 3/1969 | Bilson ................... H01R 33/94 200/51.07 |
| 3,798,584 A | * | 3/1974 | Person ................... H01R 13/71 439/102 |
| D426,339 S | | 6/2000 | Chen |
| 6,648,488 B1 | | 11/2003 | Pearce |
| 6,780,049 B1 | | 8/2004 | D'Angelo |
| 6,799,982 B2 | | 10/2004 | Kerr, Jr. |
| 7,462,066 B2 | | 12/2008 | Kohen |
| 10,326,247 B2 | * | 6/2019 | Kohen ................ H01R 33/205 |
| 10,989,400 B2 | * | 4/2021 | Kohen ................ G01D 11/30 |
| 11,133,632 B2 | * | 9/2021 | Kohen ..................... F21K 9/20 |
| 2003/0148659 A1 | * | 8/2003 | Walker ............... H01R 13/6315 439/537 |
| 2005/0265848 A1 | | 12/2005 | Tseng |

FOREIGN PATENT DOCUMENTS

WO WO2018165646 9/2018

* cited by examiner

*Primary Examiner* — Tsion Tumebo

(57) ABSTRACT

A quick release junction box assembly includes a junction box that is positionable above a ceiling in a building. A socket is positioned in the junction box, a female electrical plug is integrated into the socket and the female electrical plug is electrically coupled to the wires for receiving voltage and voltage from the wires. A plug is slidably insertable into the socket and the plug is placed in electrical communication with the building's electrical system when the plug is inserted into the socket. A locking mechanism is movably integrated into the plug to releasably engage the socket when the plug is inserted into the socket. A light fixture is coupled around the plug and the light fixture receives the electrical voltage from the building's electrical system when the plug is inserted into the socket.

10 Claims, 5 Drawing Sheets

QUICK RELEASE JUNCTION BOX ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to junction box devices and more particularly pertains to a new junction box device for replacing a light fixture without electrical knowledge or skills.

(2) Description of Related Art Including Information Disclosed Under 37 CFR 1.97 and 1.98

The prior art relates to junction box devices including a quick release socket for attaching a light fixture to a ceiling. Additionally, the prior art discloses a ceiling fan attachment device for attaching a ceiling fan to a ceiling. The prior art further discloses a quick connect coupler for attaching a ceiling fan to a ceiling. The prior art discloses a variety of connection devices that includes a plug and a socket for attaching an electrical device to a ceiling.

BRIEF SUMMARY OF THE INVENTION

An embodiment of the disclosure meets the needs presented above by generally comprising a junction box that is positionable above a ceiling in a building. A socket is positioned in the junction box, a female electrical plug is integrated into the socket and the female electrical plug is electrically coupled to the wires for receiving voltage and voltage from the wires. A plug is slidably insertable into the socket and the plug is placed in electrical communication with the building's electrical system when the plug is inserted into the socket. A locking mechanism is movably integrated into the plug to releasably engage the socket when the plug is inserted into the socket. A light fixture is coupled around the plug and the light fixture receives the electrical voltage from the building's electrical system when the plug is inserted into the socket.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
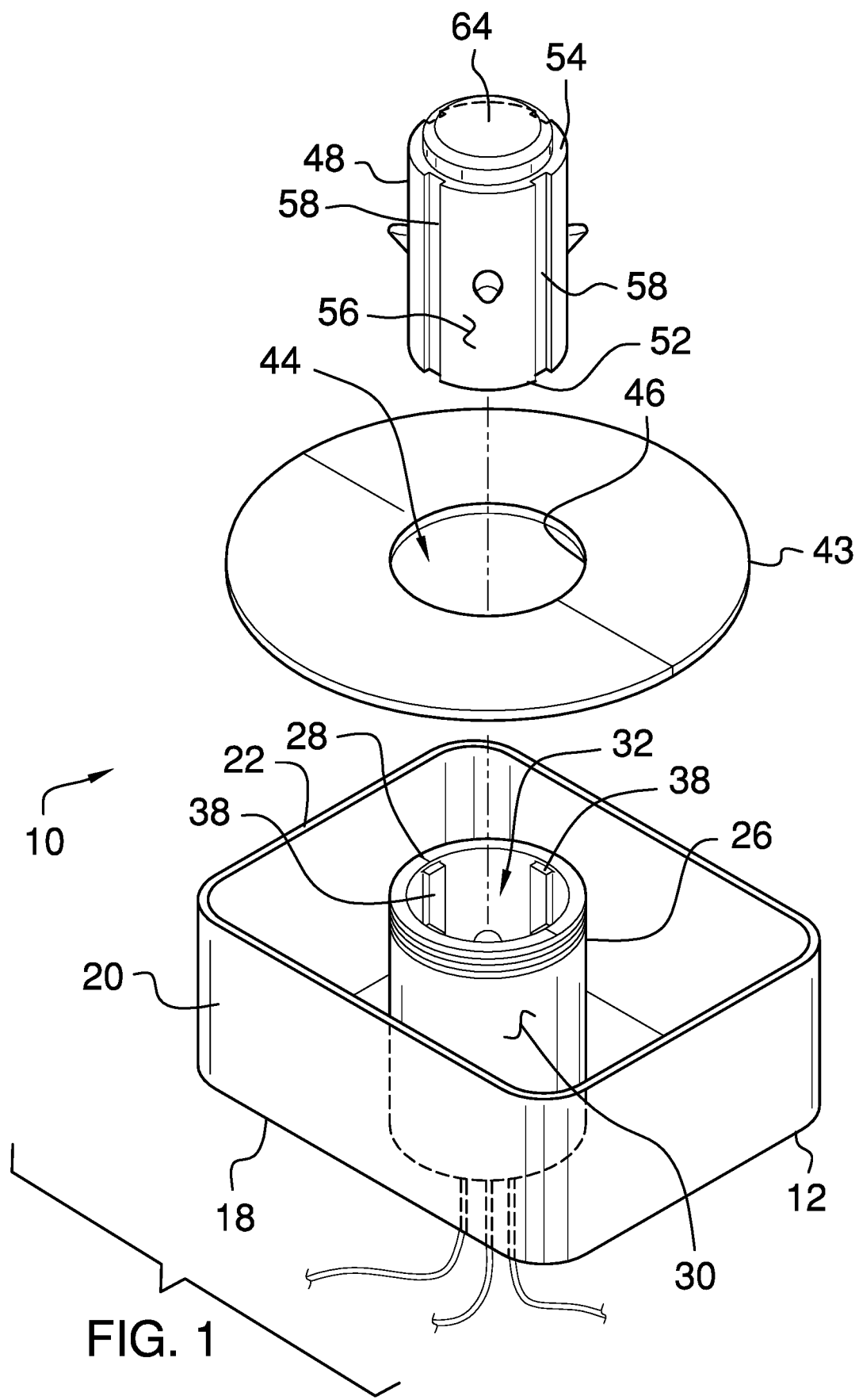
FIG. 1 is an exploded perspective view of a quick release junction box assembly according to an embodiment of the disclosure.
Figure 2:
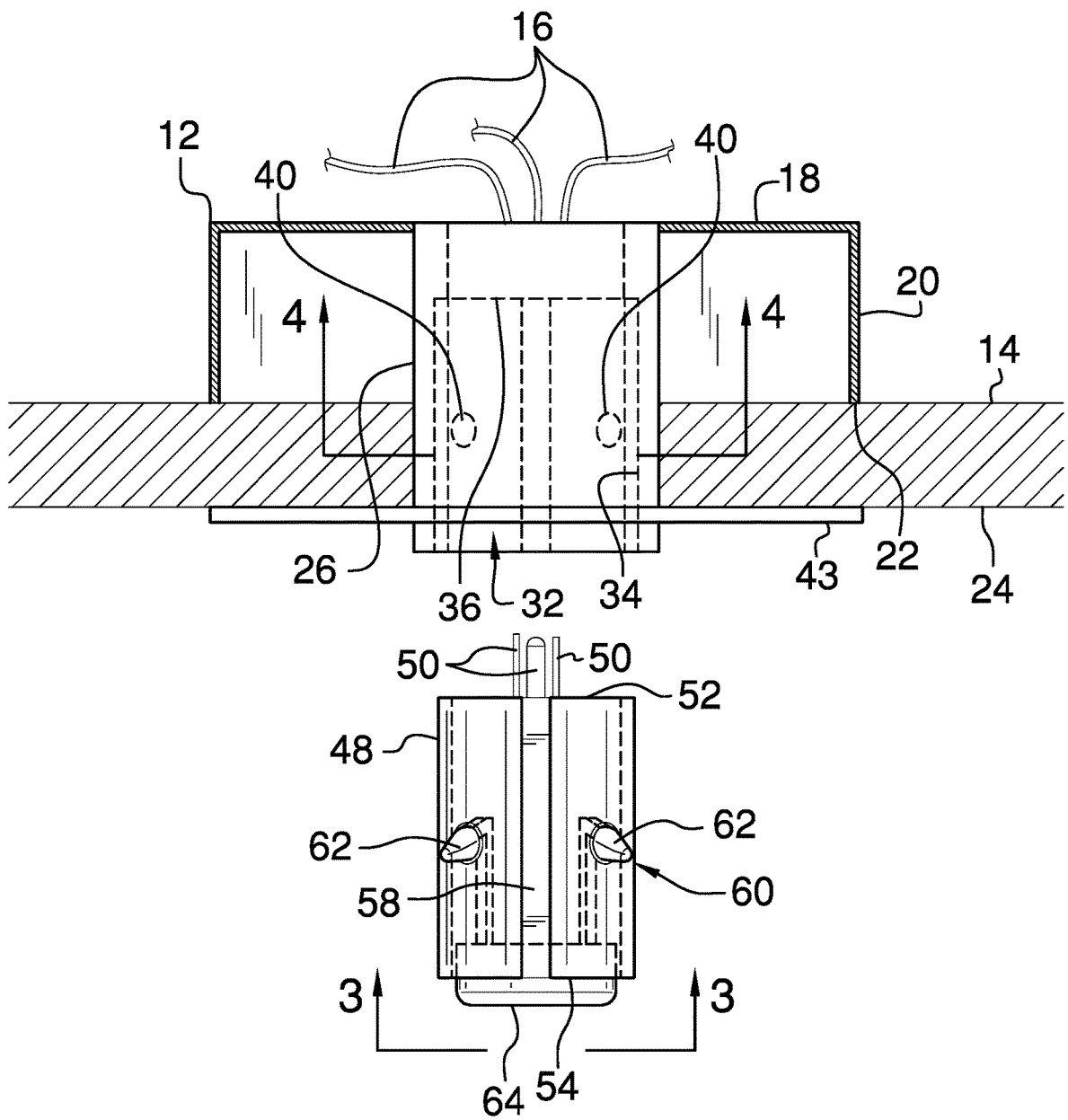
FIG. 2 is a front phantom view of an embodiment of the disclosure.
Figure 3:
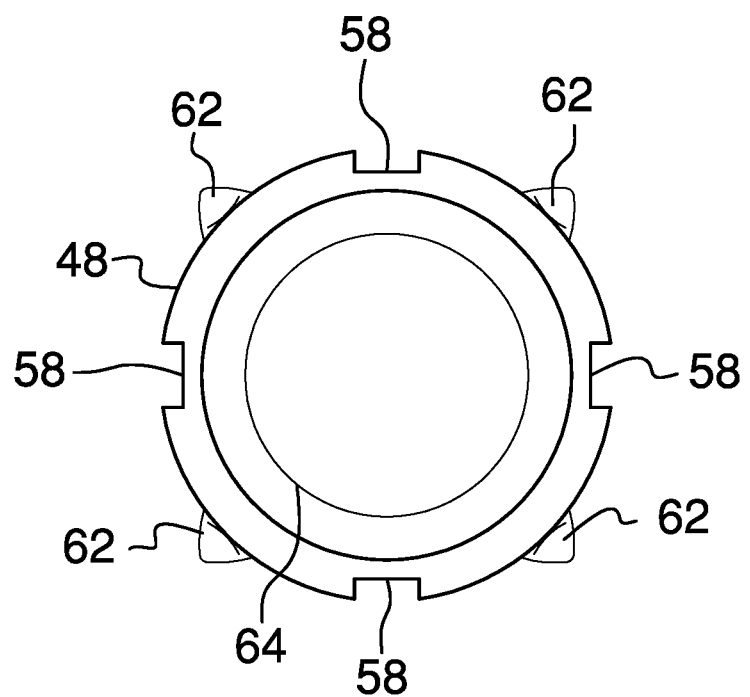
FIG. 3 is a cross sectional view taken along line 3-3 of FIG. 2 of an embodiment of the disclosure.
Figure 4:
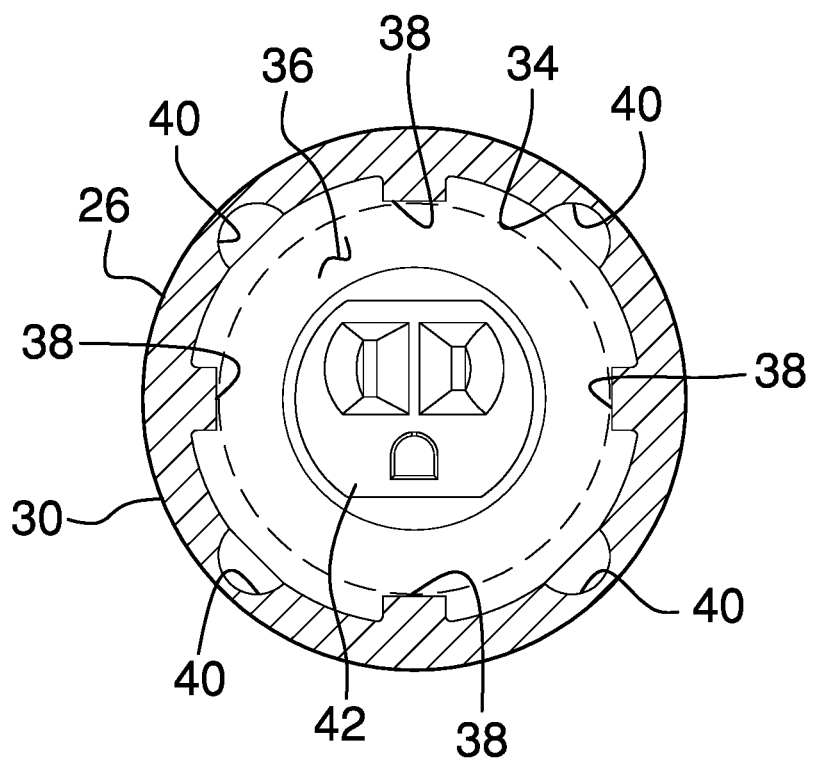
FIG. 4 is a cross sectional view taken along line 4-4 of figure of an embodiment of the disclosure.

With reference now to the drawings, and in particular to FIGS. 1 through 5 thereof, a new junction box device embodying the principles and concepts of an embodiment of the disclosure and generally designated by the reference numeral 10 will be described.

As best illustrated in FIGS. 1 through 5, the quick release junction box assembly 10 generally comprises a junction box 12 that is positionable above a ceiling 14 in a building. Additionally, the junction box 12 has wires 16 from the building's electrical system extending therein. The building may be a house, a commercial building or any other type of building that has an electrical system. The junction box 12 has an upper wall 18 and a perimeter wall 20 extending downwardly therefrom, the perimeter wall 20 has a distal edge 22 with respect to the upper wall 18 and the distal edge 22 rests against an upper surface 24 of the ceiling 14.

A socket 26 is positioned in the junction box 12 and the socket 26 has the wires 16 electrically coupled thereto. The socket 26 extends downwardly from the upper wall 18 such that the socket 26 is surrounded by the perimeter wall 20. Moreover, the socket 26 extends downwardly beyond the distal edge 22 of the perimeter wall 20 and the socket 26 has a distal end 28 with respect to the upper wall 18. The socket 26 has an outer surface 30 and the outer surface 30 is threaded adjacent to the distal end 28 of the socket 26. Moreover, the socket 26 has a well 32 extending from the distal end 28 of the socket 26 toward the upper wall 18 of the junction box 12, and the well 32 has a lateral bounding surface 34 and an upper bounding surface 36.

The lateral bounding surface 34 has a plurality of ridges 38 thereon and each of the ridges 38 extends between the upper bounding surface 36 and the distal end 28 of the socket 26. The ridges 38 are spaced apart from each other and are distributed around a full circumference of the socket 26. The lateral bounding surface 34 has a plurality of detents 40 therein and each of the detents 40 is positioned between respective pairs of the ridges 38. Each of the detents 40 is positioned between the distal edge 22 and upper bounding surface 36 of the well 32.

A female electrical plug 42 is integrated into the socket 26 and the female electrical plug 42 is electrically coupled to the wires 16 for receiving voltage and voltage from the wires 16. The female electrical plug 42 is integrated into the upper bounding surface 36 of the well 32 in the socket 26. The female electrical plug 42 may be a three prong female socket that conforms to the US National Electrical Code. A gasket 43 is provided and the gasket 43 is positionable against a lower surface of the ceiling 14. The gasket 43 releasably engages the socket 26 for attaching the socket 26 and the junction box 12 to the ceiling 14. The gasket 43 has a hole 44 extending therethrough, the hole 44 has a bounding edge 46 and the bounding edge 46 threadably engages the outer surface 30 of the socket 26 adjacent to the distal end 28 of the socket 26.

A plug 48 is provided and the plug 48 is slidably insertable into the socket 26. The plug 48 releasably engages the socket 26 for retaining the plug 48 in the socket 26. The plug 48 has a plurality of contacts 50 thereon and each of the contacts 50 is placed in electrical communication with the wires 16 of the building's electrical system when the plug 48 is inserted into the socket 26. In this way the plug 48 receives electrical voltage. The plug 48 has an upper end 52, a lower end 54 and an outside surface 56 extending therebetween.

The outside surface 56 has a plurality of slots 58 extending inwardly therein and each of the slots 58 extends between the upper end 52 and the lower end 54. Each of the slots 58 slidably engages a respective one of the ridges 38 on the socket 26 when the plug 48 is inserted into the socket 26. Each of the contacts 50 is electrically coupled to the female electrical outlet in the socket 26 when the plug 48 is fully inserted into the socket 26. In this way the plug 48 receives electrical voltage from the building's electrical system.

A locking mechanism 60 is provided and the locking mechanism 60 is movably integrated into the plug 48. The locking mechanism 60 is biased to releasably engage the socket 26 when the plug 48 is inserted into the socket 26. Conversely, the locking mechanism 60 disengages the socket 26 when the locking mechanism 60 is manipulated to facilitate the plug 48 to be removed from the socket 26. In this way the locking mechanism 60 facilitates quick release of the plug 48 with respect to the socket 26.

The locking mechanism 60 comprises a plurality of engagements 62 and each of the engagements 62 extends outwardly from the outside surface 56 of the plug 48. Moreover, each of the engagements 62 is biased to extend outwardly from the outside surface 56. Each of the engagements 62 engages a respective one of the detents 40 in the lateral bounding surface 34 of the well 32 in the socket 26 when the plug 48 is inserted into the socket 26. The locking mechanism 60 includes a button 64 that is movably integrated into the lower end 54 of the plug 48. The button 64 is in mechanical communication with each of the engagements 62. Each of the engagements 62 are recessed into the outer surface 30 of the plug 48 when the button 64 is depressed thereby facilitating the plug 48 to be removed from the socket 26. A light fixture 66 is provided and the light fixture 66 is coupled around the plug 48. The light fixture 66 is in electrical communication with each of the contacts 50 on the plug 48. In this way the light fixture 66 can receive the electrical voltage from the building's electrical system when the plug 48 is inserted into the socket 26. Additionally, the plug 48 may be manufactured as an integral component of the light fixture 66

Figure 5:
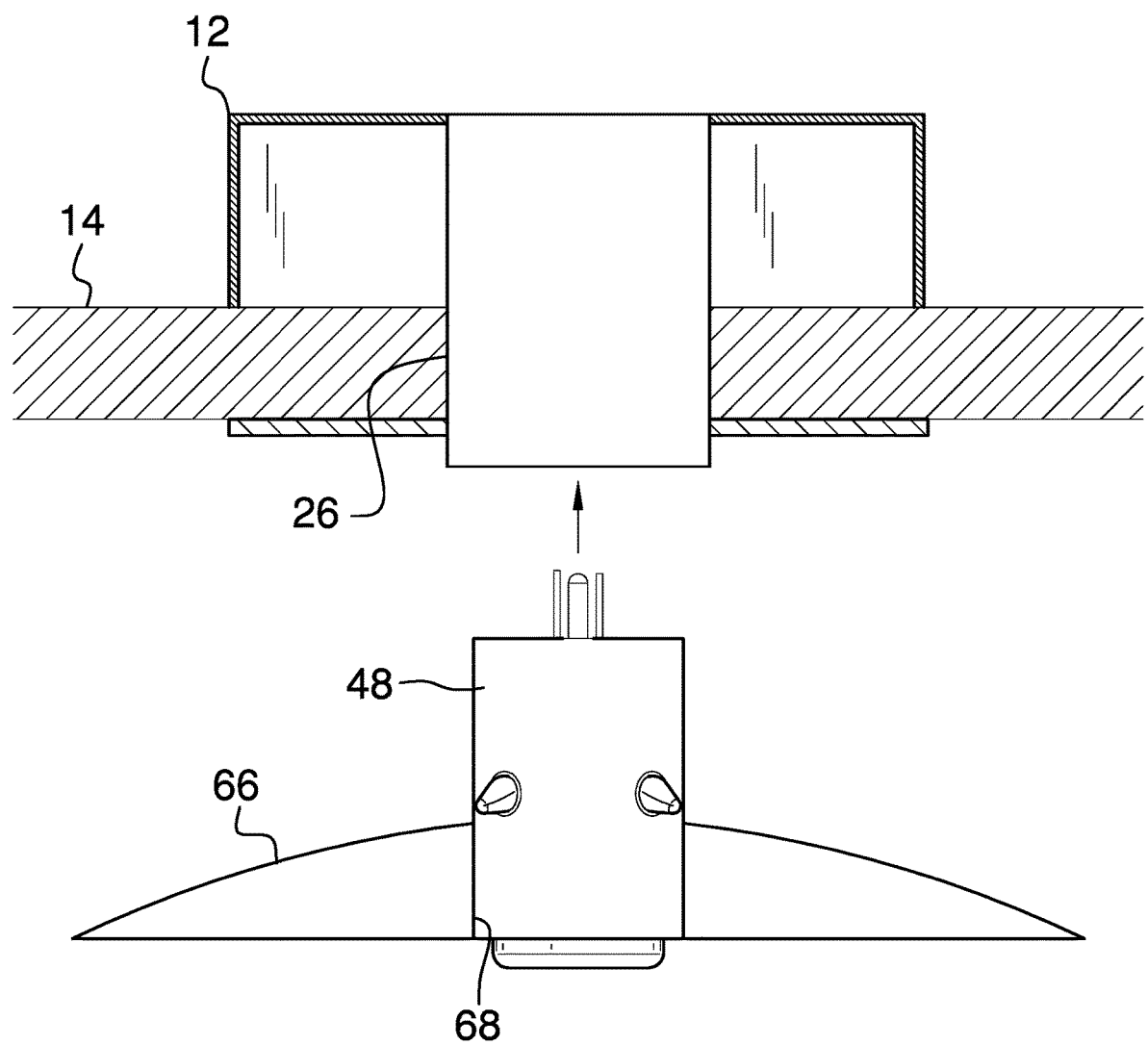
FIG. 5 is a perspective view of an embodiment of the disclosure.

As is most clearly shown in FIG. 5, the light fixture 66 is attached the plug 48 at a point located adjacent to the lower end 54 of the plug 48. Additionally, the lower end 54 of the plug 48 is exposed with respect to the light fixture 66 thereby facilitating the button 64 to be accessible for depressing. The light fixture 66 may be a light fixture of any conventional design that includes a glass surround and light emitters. Additionally, the glass surround has a hole 68 that is centrally located thereon to facilitate the lower end 54 of the plug 48 to extend therethrough. In this way the light fixture 66 and the plug 48 facilitate the light fixture 66 to be replaced with a different light fixture without requiring electrical work as is commonly associated with replacing light fixtures. Additionally, the light fixture 66 may be a ceiling fan or other similar device would commonly be mounted to the ceiling 14.

In use, the junction box 12 is wired into the electrical system of the building and the junction box 12, along with the socket 26, is installed at a location on the ceiling 14 where the light fixture 66 is to be located. The plug 48 is inserted into the socket 26 to facilitate the light fixture 66 to be mounted on the ceiling 14 as well as to facilitate the light fixture 66 to receive electrical voltage. The button 64 is depressed in order to facilitate the light fixture 66 and the plug 48 to be removed from the socket 26. In this way the light emitters in the light fixture 66 can be replaced, as well as facilitating an entirely new light fixture to be installed without the need for electrical work to be performed.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A quick release junction box assembly to facilitate an unskilled person to remove and replace a light fixture, said assembly comprising:
   a junction box being positionable above a ceiling in a building wherein said junction box is configured to have wires from the building's electrical system therein, wherein said junction box has an upper wall and a perimeter wall extending downwardly therefrom, said perimeter wall having a distal edge with respect to said upper wall, said distal edge resting against an upper surface of the ceiling;

a socket being positioned in said junction box wherein said socket is configured to have the wires electrically coupled thereto;

a female electrical plug being integrated into said socket wherein said female electrical plug is configured to be electrically coupled to the wires for receiving voltage and voltage from the wires;

a gasket being positionable against a lower surface of the ceiling, said gasket releasably engaging said socket for attaching said socket and said junction box to the ceiling;

a plug being slidably insertable into said socket, said plug releasably engaging said socket for retaining said plug in said socket, said plug having a plurality of contacts thereon, each of said contacts being placed in electrical communication with the wires of the building's electrical system when said plug is inserted into said socket wherein said plug is configured to receive electrical voltage;

a locking mechanism being movably integrated into said plug, said locking mechanism being biased to releasably engage said socket when said plug is inserted into said socket, said locking mechanism disengaging said socket when said locking mechanism is manipulated to facilitate said plug to be removed from said socket;

a light fixture being coupled around said plug, said light fixture being in electrical communication with each of said contacts on said plug wherein said light fixture is configured to receive the electrical voltage from the building's electrical system when said plug is inserted into said socket;

wherein said socket extends downwardly from said upper wall such that said socket is surrounded by said perimeter wall, said socket extending downwardly beyond said distal edge of said perimeter wall, said socket having a distal end with respect to said upper wall, said socket having a well extending from said distal end of said socket toward said upper wall of said junction box, said well having a lateral bounding surface and an upper bounding surface, said socket having an outer surface, said outer surface being threaded adjacent to said distal end of said socket; and wherein said female electrical plug is integrated into said upper bounding surface of said well in said socket.

2. The assembly according to claim 1, wherein said lateral bounding surface has a plurality of ridges thereon, each of said ridges extending between said upper bounding surface and said distal end of said socket, said ridges being spaced apart from each other and being distributed around a full circumference of said socket.

3. The assembly according to claim 1, wherein said lateral bounding surface has a plurality of detents therein, each of said detents being positioned between respective pairs of said ridges, each of said detents being positioned between said distal edge and upper bounding surface of said well.

4. The assembly according to claim 1, wherein said gasket has a hole extending therethrough, said hole having a bounding edge, said bounding edge threadably engaging said outer surface of said socket adjacent to said distal end of said socket.

5. The assembly according to claim 2, wherein said plug has an upper end, a lower end and an outside surface extending therebetween, said outside surface having a plurality of slots extending inwardly therein, each of said slots extending between said upper end and said lower end, each of said slots slidably engaging a respective one of said ridges on said socket when said plug is inserted into said socket.

6. The assembly according to claim 1, wherein each of said contacts on said plug is electrically coupled to said female electrical outlet in said socket when said plug is fully inserted into said socket wherein said plug is configured to receive electrical voltage from the building's electrical system.

7. The assembly according to claim 5, wherein:

said lateral bounding surface of said well in said socket has a plurality of detents therein, each of said detents being positioned between respective pairs of said ridges, each of said detents being positioned between said distal edge and upper bounding surface of said well; and said locking mechanism comprises a plurality of engagements, each of said engagements extending outwardly from said outside surface of said plug, each of said engagements being biased to extend outwardly from said outside surface, each of said engagements engaging a respective one of said detents in said lateral bounding surface of said well in said socket when said plug is inserted into said socket.

8. The assembly according to claim 7, wherein said locking mechanism includes a button being movably integrated into said lower end of said plug, said button being in mechanical communication with each of said engagements, each of said engagements being recessed into said outer surface of said plug when said button is depressed thereby facilitating said plug to be removed from said socket.

9. The assembly according to claim 8, wherein said light fixture is attached to said outside surface of said plug at a point located adjacent to said upper end of said plug, said lower end of said plug being exposed with respect to said light fixture thereby facilitating said button to be accessible for depressing.

10. A quick release junction box assembly to facilitate an unskilled person to remove and replace a light fixture, said assembly comprising:

a junction box being positionable above a ceiling in a building wherein said junction box is configured to have wires from the building's electrical system therein, said junction box having an upper wall and a perimeter wall extending downwardly therefrom, said perimeter wall having a distal edge with respect to said upper wall, said distal edge resting against an upper surface of the ceiling;

a socket being positioned in said junction box wherein said socket is configured to have the wires electrically coupled thereto, said socket extending downwardly from said upper wall such that said socket is surrounded by said perimeter wall, said socket extending downwardly beyond said distal edge of said perimeter wall, said socket having a distal end with respect to said upper wall, said socket having a well extending from said distal end of said socket toward said upper wall of said junction box, said well having a lateral bounding surface and an upper bounding surface, said lateral bounding surface having a plurality of ridges thereon, each of said ridges extending between said upper bounding surface and said distal end of said socket, said ridges being spaced apart from each other and being distributed around a full circumference of said socket, said lateral bounding surface having a plurality of detents therein, each of said detents being positioned between respective pairs of said ridges, each of said detents being positioned between said distal edge and upper bounding surface of said well, said socket having an outer surface, said outer surface being threaded adjacent to said distal end of said socket;

a female electrical plug being integrated into said socket wherein said female electrical plug is configured to be electrically coupled to the wires for receiving voltage and voltage from the wires, said female electrical plug being integrated into said upper bounding surface of said well in said socket;

a gasket being positionable against a lower surface of the ceiling, said gasket releasably engaging said socket for attaching said socket and said junction box to the ceiling, said gasket having a hole extending therethrough, said hole having a bounding edge, said bounding edge threadably engaging said outer surface of said socket adjacent to said distal end of said socket;

a plug being slidably insertable into said socket, said plug releasably engaging said socket for retaining said plug in said socket, said plug having a plurality of contacts thereon, each of said contacts being placed in electrical communication with the wires of the building's electrical system when said plug is inserted into said socket wherein said plug is configured to receive electrical voltage, said plug having an upper end, a lower end and an outside surface extending therebetween, said outside surface having a plurality of slots extending inwardly therein, each of said slots extending between said upper end and said lower end, each of said slots slidably engaging a respective one of said ridges on said socket when said plug is inserted into said socket, each of said contacts being electrically coupled to said female electrical outlet in said socket when said plug is fully inserted into said socket wherein said plug is configured to receive electrical voltage from the building's electrical system;

a locking mechanism being movably integrated into said plug, said locking mechanism being biased to releasably engage said socket when said plug is inserted into said socket, said locking mechanism disengaging said socket when said locking mechanism is manipulated to facilitate said plug to be removed from said socket, said locking mechanism comprising:

a plurality of engagements, each of said engagements extending outwardly from said outside surface of said plug, each of said engagements being biased to extend outwardly from said outside surface, each of said engagements engaging a respective one of said detents in said lateral bounding surface of said well in said socket when said plug is inserted into said socket; and a button being movably integrated into said lower end of said plug, said button being in mechanical communication with each of said engagements, each of said engagements being recessed into said outer surface of said plug when said button is depressed thereby facilitating said plug to be removed from said socket; and a light fixture being coupled around said plug, said light fixture being in electrical communication with each of said contacts on said plug wherein said light fixture is configured to receive the electrical voltage from the building's electrical system when said plug is inserted into said socket, said light fixture being attached to said outside surface of said plug at a point located adjacent to said upper end of said plug, said lower end of said plug being exposed with respect to said light fixture thereby facilitating said button to be accessible for depressing.

* * * * *